Dec. 16, 1969  J. T. MATSUOKA  3,483,595
EXTRUDER
Original Filed Aug. 25, 1966  3 Sheets-Sheet 1

INVENTOR
JAMES T. MATSUOKA
BY Watts, Hoffmann,
Fisher & Heinke
ATTORNEYS

Dec. 16, 1969         J. T. MATSUOKA         3,483,595
                          EXTRUDER
Original Filed Aug. 25, 1966                 3 Sheets-Sheet 2

INVENTOR
JAMES T. MATSUOKA
BY Watts, Hoffmann,
Fisher & Heinke
ATTORNEYS

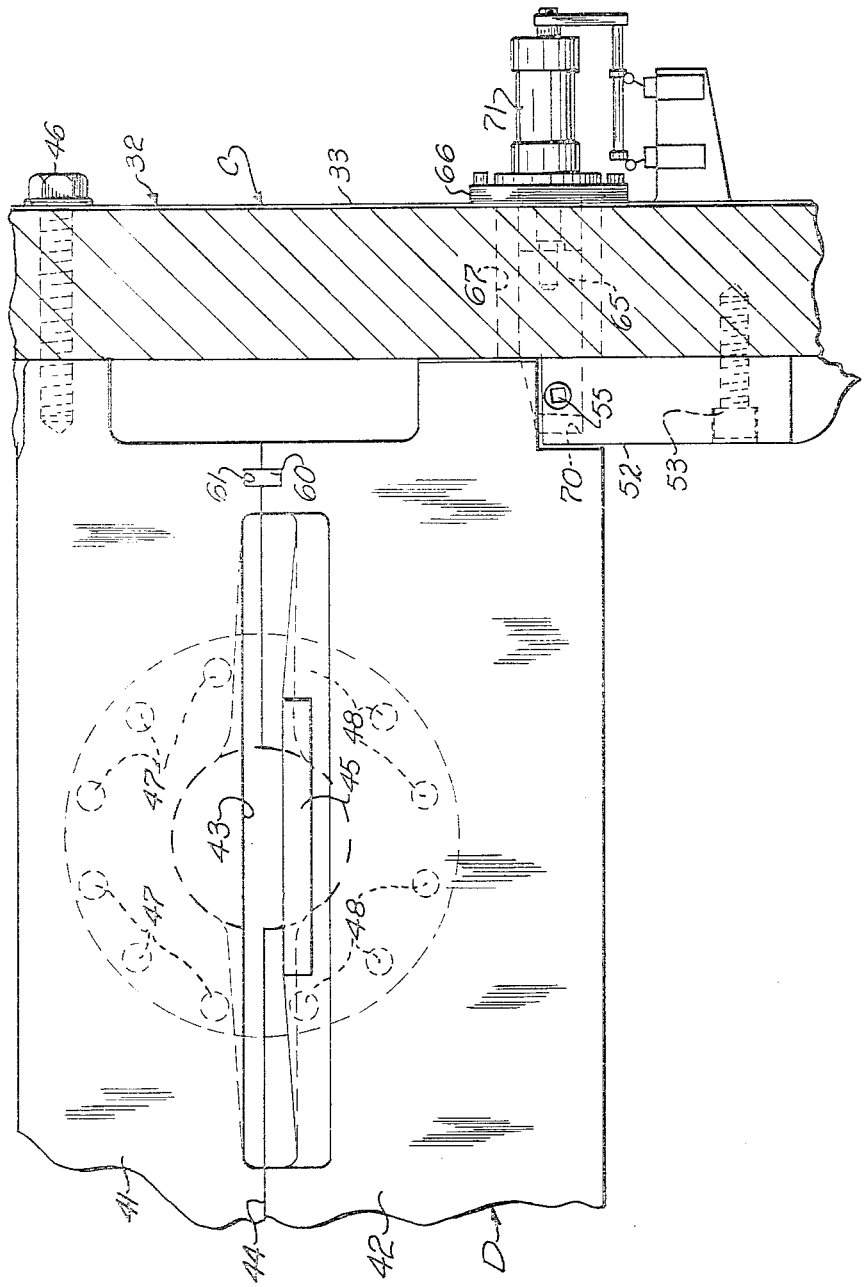

United States Patent Office 3,483,595
Patented Dec. 16, 1969

3,483,595
EXTRUDER
James T. Matsuoka, Brecksville, Ohio, assignor to Intercole Automation, Inc., a corporation of Ohio
Original application Aug. 25, 1966, Ser. No. 575,132, now Patent No. 3,408,694. Divided and this application June 21, 1968, Ser. No. 738,991
Int. Cl. B29f 3/06
U.S. Cl. 18—2                                                    4 Claims

ABSTRACT OF THE DISCLOSURE

In a slot-type die, sheet or slab screw extruder, constant screw pressure is maintained on the material being processed by means of eddy current coupling sensitive to variation in the power input to an induction motor driving the coupling and in turn the extruder screw.

Cross reference to related application

This application is a division of application Ser. No. 575,132, filed Aug. 25, 1966.

Technical field

The present invention relates to extruding methods and apparatus for the rubber and other plastic industries.

Summary of the invention

The invention provides a novel method and apparatus for processing plastic material utilizing an extruder screw in which a constant pressure is maintained by the extruder screw on the material being processed at all times during operation of the apparatus.

The invention resides in certain operations and constructions and arrangements of parts of a screw-type extruder and further objects and advantages of the invention will be apparent from the following description of the preferred embodiment described with reference to the accompanying drawings forming a part of this specification in which similar reference characters designate corresponding parts, and in which:

FIGURE 3 is a fragmentary sectional view approximately on the line 3—3 of FIGURE 2, but showing the die in elevation.

Figure 1:
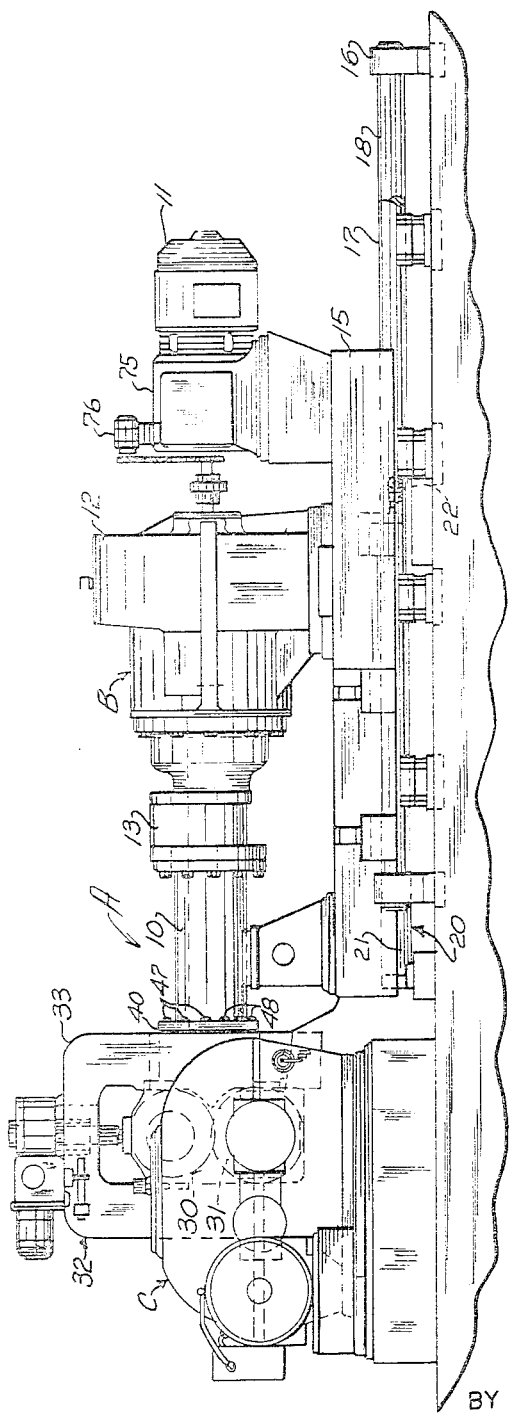
FIGURE 1 is a side elevation of a combination extruding and calendering apparatus embodying the present invention.
Figure 4:
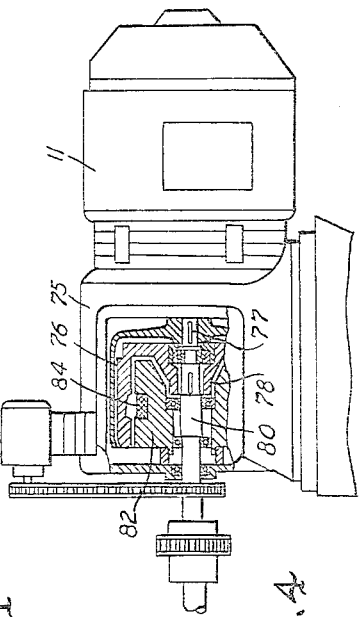
FIGURE 4 is a fragmentary enlarged view of a portion of FIGURE 1 with parts broken away and in section.
Figure 2:
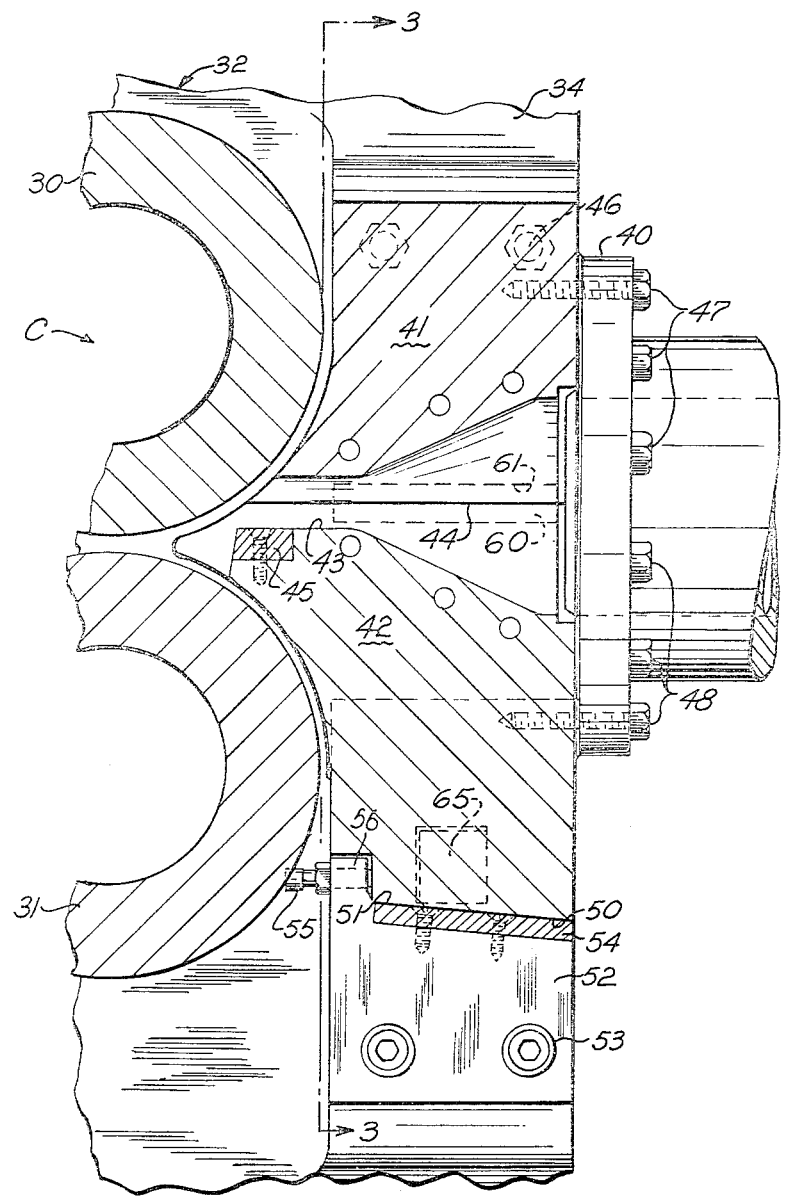
FIGURE 2 is a fragmentary vertical sectional view of the die and adjoining portion of the apparatus shown in FIGURE 1.

While the invention may be illustrated or incorporated in various apparatuses it is herein shown and described as embodied in a combination extruder and calender apparatus of the type employed in the rubber and other plastic industries in the manufacture of sheets and slabs. The complete unit is designated A. The extruder or extruding part B of the apparatus, except for the differences hereinafter mentioned, may be of any commercial construction and will not be described in detail except to say that the extruder proper, designated by the reference character 10, is of the screw type, is driven by a motor 11 through a suitable speed reducer 12 and has a hopper 13 into which the material to be extruded is fed in any known manner.

The extruder 10, electric drive motor 11 and speed reducer 12 are detachably mounted on a frame 15 slidably supported on a bed 16 comprising two fixed slide bars 17 and 18. The frame 15 is adapted to be moved toward and from the calender or calendering part C of the apparatus A by a hydraulic cylinder or reciprocating-type double-acting pressure-fluid motor 20 positioned between the slide bars 17 and 18 and having its cylinder 21 connected to the bed 16 while the piston rod 22 is connected to a cross-member of the frame 15.

The calender part C of the apparatus is stationary and except for the differences hereinafter noted, is of well known construction and will not be described in detail. Suffice it to say that it comprises two calender rolls 30, 31 supported, with the conventional adjustments, one above the other in a frame 32 comprising end frame members 33, 34. The rolls 30, 31 are driven by an electric motor through a suitable speed reducer.

In addition to the extruder part B and the calender part C, the apparatus A comprises a die unit, designated generally as D, interposed between a flange 40 on the end of the extruder proper and the calender rolls and which feed directly into the calender rolls. The die unit D is of the slot-type and is split horizontally into two parts 41 and 42 through the slot 43.

Aside from being split horizontally through the slot 43 along the line 44 and the manner in which it is supported, the die may be of any conventional slot-type die including desired cooling or heating passages and it will not be described in detail. The die is located between the end frame members 33 and 34 with the open end of the slot 43 adjacent to the opening between the rolls 30 and 31 but slightly above the same. A portion of the lower side wall of the slot 43 in the lower die member 42 is formed by a replaceable insert 45 which can be replaced by other inserts of different contour to change the distribution of the material as it is extruded from the die.

The top or upper die part 41 has its opposite ends bolted as by bolts 46 to the side frame members 33 and 34 and is carried by the frame of the calender part C of the apparatus. The lower die part 42 is not fixedly connected to the calender C but is connected to the extruder B and is adapted to be carried by and movable toward and from the calender with the extruder part of the apparatus.

During operation of the apparatus the upper die part 41 of the die D is preferably detachably connected as by the top bolts 47 to the upper part of the flange 40. In this event these bolts are removed before the extruder part B is moved away from the calender part C of the apparatus. The lower guide member 42, however, remains bolted as by the lower bolts 48 to the lower part of the flange during movement of the extruder part B of the apparatus.

The under side of the lower die part 42 has an inclined surface 50 adjacent to each end thereof adapted to cooperate with tapered or inclined surfaces 51 on members 52 bolted as by the cap screws 53 to the side frame member 33, 34 below the die. The surfaces 50 and 51 are inclined upwardly toward the calender rolls at a slight angle, for example 5°. In the embodiment shown the surfaces 50 are on a renewable hard bronze wear plate 54 inserted in the top of the member 52. The construction is such that as the lower die part 42 is moved into position underneath the upper die part 41 it is moved upwardly by the cooperating inclined surfaces 50 and 51 into alignment with the calender rolls and engagement with the underside of the top die part 41. Adjustable stop screws 55 carried by a flange 56 on the member 52 are employed to adjust and limit the forward position of the upper die part 42 relative to the calender rolls and/or the upper die part 41. In order to assure proper alignment of the die parts 41 and 42 as the lower die part 42 is moved underneath the upper die part 41 suitable keys, such as the key 60 shown, may be provided at one or both sides of the die slot. The key 60 shown is carried by the lower die part 42 and engages in a suitable keyway 61 in the upper die part 41.

To assure that the two die parts 41 and 42 are in tight engagement with one another along the split line 44, and that the lower die part 42 is held against the stop screw 55 during operation of the apparatus, pressure fluid operated wedge members 65 are provided at opposite ends of the lower die member 42. The wedge members 65 are shown as incorporated in units 66 removably connected to opposite frame members 33 and 34 of the calender part of the apparatus. The wedge members 65 have end portions the front and upper surfaces of which, as viewed in FIGURE 3, are inclined or tapered and which end portions are adapted to be projected into or withdrawn from cooperating apertures 70 in opposite ends of the lower die member 42, by selective operation of the pressure fluid motors 71 of the double acting-type which motors also form part of the unit 66. The wedge members 65 are rectangular in cross section as are the apertures 67 in the lower die member 42 and the front and upper surfaces of the apertures 67 are inclined to cooperate with the inclined surfaces on the wedge members 65 to force the die member 42 toward the calender rolls and the upper die members. Any suitable control mechanism may be employed for supplying and exhausting fluid to and from the motors 71 and such control mechanism, which is preferably interlocked with the control for the motor 20 so as to prevent operation of the motor 20 with the ends of the wedges in the apertures 70, is not herein shown nor described. While cooling or heating means is not shown for the die D, it is to be understood that either or both parts of the die may be provided with suitable passages or conduit means for the circulation of a cooling or a heating fluid.

As previously mentioned one of the objects of the invention is to provide an apparatus of the character referred to wherein a constant die back pressure of material is maintained by the extruder screw at all times during operation of the extruder. This is accomplished in the preferred embodiment of the invention shown by the use of a General Electric Company KINATROL drive unit comprising the induction motor 11 integrally mounted with an eddy current coupling 75 interposed between the motor 11 and the gear reducer 12. The drive referred to is not described in detail since it is commercially available, see circulars Nos. GEC–1530E(10–64), GEA–7560A(12–64), and GEH–3255(4–66), published by General Electric Company. The coupling 75 comprises a cast steel drum assembly 76 keyed to the driven shaft 77 of the motor 11, which shaft forms the input shaft of the coupling, a cast steel pole assembly 78 keyed to the output shaft 80 of the coupling, and a stationary magnet assembly 82 having a field coil 84. In one successful commercial apparatus embodying the invention herein disclosed the motor 11 was a General Electric Company motor K445, 150 h.p. 220/440 1800 r.p.m. AC motor, and the coupling 75 was a Model 5EC488C51, G1142 water cooled eddy current coupling 150 h.p. 1685/100 r.p.m. and the control included a tachometer follower 76. On the same apparatus a similar motor and coupling was employed to drive the calender rolls. The drive for the extruder screw sensed variation in torque by means of a current transformer in one of the electric supply lines of the motor 11 and maintains a constant back pressure in the die by applying in a manner understood in the art a constant torque drive to the extruder screw.

As noted in the referenced publications, and as is well known, induction motor (such as the motor 11) is essentially a constant speed device. The current through a winding of the motor that is, the electric input power to the motor is a function of the torque output of the motor. Therefore, a current transformer inserted in series with one of the motor windings provides a signal proportional to torque.

The eddy current coupling provides torque transfer, rather than torque conversion, so that its output torque is substantially equal to its input torque at all times. Therefore, by using the signal derived from the current transformer to control the eddy current coupling, a constant output torque and hence constant extruder screw pressure on the material in the extruder can be maintained.

While a particular mechanism has been mentioned and is preferred for maintaining a constant torque drive to the extruder screw, it is to be understood that this mechanism is merely illustrative of other mechanisms capable of performing the same function and which may be substituted therefore.

From the foregoing description of the preferred embodiment of the invention it will be apparent that the objects heretofore enumerated and others have been accomplished and that there has been provided a novel and improved screw type extruder.

While the preferred embodiment of the invention has been shown and described in considerable detail, the invention is not limited to the particular embodiment of the apparatus shown and described, and it is the intention to hereby cover all adaptations, modifications and uses thereof which may come within the practice of those skilled in the art to which the invention relates and within the scope of the appended claims.

What is claimed is:

1. In apparatus for processing plastic material, die means for shaping plastic material, extruder means including an extruder screw for forcing material through said die means, power means operatively connected to said extruder screw for rotating the latter, and control means for maintaining the torque applied to said extruder screw constant.

2. In apparatus for processing plastic material, die means for shaping plastic material, extruder means including an extruder screw for forcing material through said die means, power means for rotating said extruder screw comprising an induction motor, an eddy current coupling means comprising a field coil magnet operatively connected between said induction motor and said extruder screw, and control means for automatically varying the field coil current of said eddy current coupling means as a function of the electrical power input to said induction motor during operation of the apparatus to maintain the torque applied to said extruder screw constant.

3. A method of processing plastic material which comprises, feeding plastic material into a screw-type extruder having die means at its discharge end for shaping plastic material, driving the extruder screw to force material to flow through the die means by drive means operatively connected to the extruder screw and controlling the drive means to maintain the torque applied to the extruder screw constant.

4. A method of processing plastic material which comprises, feeding plastic material into a screw-type extruder having a restricted discharge orifice, driving the extruder screw to force material to flow through the discharge orifice by power means comprising an induction motor operatively connected to the extruder screw by an eddy current coupling means comprising a field coil magnet assembly and varying the field coil current of the eddy current in coupling means in response to the electrical power input to the induction motor to maintain the torque applied to the extruder screw constant.

References Cited

UNITED STATES PATENTS

| | | |
|---|---|---|
| 2,747,224 | 5/1956 | Koch et al. |
| 2,977,631 | 4/1961 | Komarek et al. |
| 3,111,707 | 11/1963 | Buckley. |
| 3,286,302 | 11/1966 | Doering. |
| 3,340,565 | 9/1967 | Holly. |
| 3,357,049 | 12/1967 | Spindler. |

FOREIGN PATENTS 998,725    7/1965    Great Britain.

WILLIAM J. STEPHENSON, Primary Examiner

U.S. Cl. X.R.

18—12